United States Patent
Newcomb et al.

(10) Patent No.: US 11,104,042 B2
(45) Date of Patent: Aug. 31, 2021

(54) METHOD OF MAKING A COMPOSITE MOTOR HOUSING USING LOW ENERGY CURING

(71) Applicant: GM GLOBAL TECHNOLOGY OPERATIONS LLC, Detroit, MI (US)

(72) Inventors: Bradley A. Newcomb, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 37 days.

(21) Appl. No.: 16/593,575

(22) Filed: Oct. 4, 2019

(65) Prior Publication Data
US 2021/0101317 A1 Apr. 8, 2021

(51) Int. Cl.
*B29C 35/02* (2006.01)
*B29C 53/84* (2006.01)
(Continued)

(52) U.S. Cl.
CPC .............. *B29C 35/02* (2013.01); *B29B 11/16* (2013.01); *B29C 53/56* (2013.01); *B29C 53/845* (2013.01);
(Continued)

(58) Field of Classification Search
CPC ....... B29C 35/02; B29C 53/56; B29C 53/845; B29B 11/16; B29K 2105/24; B29K 2105/06
See application file for complete search history.

(56) References Cited

U.S. PATENT DOCUMENTS 3,815,773 A * 6/1974 Duvall ...................... F17C 1/16
220/590
6,125,528 A * 10/2000 Van Dine ................. H02K 5/00
29/527.1
(Continued)

FOREIGN PATENT DOCUMENTS

EP 3444512 A1 2/2019

OTHER PUBLICATIONS

Korotkov et al, "The Simultaneous Process of Filament Winding and Curing for Polymer Composites", Composites Science and Technology, vol. 47, Issue 4, 1993, pp. 383-388.*
(Continued)

*Primary Examiner* — Jeffry H Aftergut
(74) *Attorney, Agent, or Firm* — Harness, Dickey & Pierce, P.L.C.

(57) ABSTRACT

Methods of making a composite article, such as a motor housing, are provided herein. The method can include applying a resin-fiber material to a shaped surface to form an intermediate article. The resin-fiber material includes an uncured resin composition and a fiber substrate material.
(Continued)

The method further includes solidifying the uncured resin composition present in the intermediate article to form the composite article. Solidifying can be accomplished by applying heat to the intermediate article to initiate an exothermic reaction comprising polymerization, cross-linking, or both of the uncured resin composition. Application of the heat from the heat source can be ceased after initiation of the exothermic reaction, but polymerization, cross-linking or both of remaining uncured resin composition can continue in one or more of a radial, circumferential, or axial direction through a thickness of the resin-fiber material in the absence of heat from the heat source to form the composite article.

9 Claims, 6 Drawing Sheets

(51) Int. Cl.
  *B29B 11/16* (2006.01)
  *B29C 53/56* (2006.01)
  *B29K 105/06* (2006.01)
  *B29K 105/24* (2006.01)
(52) U.S. Cl.
  CPC ...... *B29K 2105/06* (2013.01); *B29K 2105/24* (2013.01)

(56) References Cited

U.S. PATENT DOCUMENTS

| | | |
|---|---|---|
| 10,001,209 B2 | 6/2018 | Kia et al. |
| 10,280,974 B2 | 5/2019 | Newcomb et al. |
| 2018/0230642 A1* | 8/2018 | Robertson ............... C08K 5/50 |
| 2018/0245681 A1 | 8/2018 | Newcomb et al. |

OTHER PUBLICATIONS

Tech Tip 23 "Tg—Glass Transition Temperature for Epoxies" from www.epotek.com, from at least Dec. 12, 2014 from the wayback machine.*

Research Disclosure No. 401002, Self-sustaining polymer cure techniques, Aug. 20, 1997.*

"Automated Filament Winding Line for LPG, CNG, Hydrogen and Other Types of High Pressure Vessels," Mikrosam®. <URL: https://mikrosam.com/new/article/en/automated-filament-winding-line-for-lpg-cng-hydrogen-and-other-types-of-high-pressure-vessels/> [retrieved: Jul. 22, 2019].

Kokan, David, "Development of an Improved Filament-Winding Process Model," University of Oklahoma: Engineering Media Lab. <URL:http://eml.ou.edu/gramoll/Research/FilWind.htm> [retrieved: Jul. 22, 2019].

First Office Action for German Patent Application No. 102020124561.0 issued May 19, 2021 with correspondence dated Jun. 1, 2021 from Manitz, Finsterwald & Partner summarizing contents; 8 pages.

* cited by examiner

METHOD OF MAKING A COMPOSITE MOTOR HOUSING USING LOW ENERGY CURING

INTRODUCTION

This section provides background information related to the present disclosure which is not necessarily prior art.

Composite articles can be formed by using a fiber substrate material, for example, carbon fibers, that also includes a resin material. The fiber substrate material including the resin material can be applied to a mandrel or other shaped surface to form a composite or layup that conforms to the desired geometry of the finished composite article. The composite may include one or more layers, where each layer can be formed from contacting and/or overlapping strips of the fiber substrate material including the resin material. Following application of the fiber substrate material to the mandrel or other shaped surface, the resin can be cured or solidified thereby bonding single or multiple layers together in the composite.

There are typically two methods for incorporating resin into the fiber substrate material: 1) wet winding/layup or 2) pre-impregnating (referred to as "pre-preg"). For wet winding, the dry fiber is "wetted" with the resin as it is used, usually by submersion through a bath and the wetted fiber with resin can then be applied or wound to the mandrel or other shaped surface. The second method, pre-preg involves wetting the resin into the fiber substrate material in advance, which has conventionally included a step of partially curing the resin so that it has a tacky consistency (e.g., to a B-stage partial cure state), and then winding up the fiber-based substrate material or storing it for later, subsequent use. Regardless of the method for incorporating resin into the fiber substrate material, a curing process is required to solidify the resin material to form the composite article. Curing typically involves placing the mandrel or other shaped surface with the applied fiber substrate material and resin in an oven for a period of time, for example, ranging from 30 minutes to 2 hours depending on the cure temperature. However, such cure times and processes require high energy and expensive equipment. Thus, methods for producing composite articles, which can be achieved with lower energy curing are needed.

SUMMARY

This section provides a general summary of the disclosure, and is not a comprehensive disclosure of its full scope or all of its features.

The present disclosure relates to methods of making composite article with lower energy curing.

In various aspects, the present disclosure provides a method of making a composite article. The method includes applying a resin-fiber material to a shaped surface to form an intermediate article. The resin-fiber material includes an uncured resin composition and a fiber substrate material. The method further includes solidifying the uncured resin composition present in the intermediate article to form the composite article including a solidified resin composition and the fiber substrate material. The solidifying includes applying heat from a heat source to a first exterior surface of the intermediate article, the shaped surface, or both to initiate an exothermic reaction includes polymerization, cross-linking, or both of the uncured resin composition. Solidifying also includes ceasing application of the heat from the heat source after initiation of the exothermic reaction, wherein polymerization, cross-linking or both of remaining uncured resin composition continues in a radial direction, a circumferential direction, an axial direction, or combination thereof through a thickness of the resin-fiber precursor material in the absence of heat from the heat source to form the composite article.

In various aspects, the heat is applied from the heat source to the shaped surface of the intermediate article and the exothermic reaction is initiated in the uncured resin composition adjacent to the shaped surface of the intermediate article. After application of the heat from the heat source is ceased, polymerization, cross-linking or both of the remaining uncured resin composition continues in an outward radial direction, a circumferential direction, an axial direction, or combination thereof through the thickness of the resin-fiber material toward the first exterior surface of the intermediate article.

In various aspects, the heat is applied from the heat source to the first exterior surface of the intermediate article and the exothermic reaction is initiated in the uncured resin composition adjacent to the first exterior surface of the intermediate article. After application of the heat from the heat source is ceased, polymerization, cross-linking or both of the remaining uncured resin composition continues in an inward radial direction, a circumferential direction, an axial direction, or combination thereof through the thickness of the resin-fiber material toward the shaped surface of the intermediate article.

In various aspects, the heat source is selected from the group consisting of a heating coil, a heated rod, a heat blanket, a heated wire, a heat lamp, heated air, an ultraviolet source, an oven, or a combination thereof.

In various aspects, the shaped surface has a cylindrical shape and the resin-fiber material is circumferentially applied around the shaped surface. The shaped surface includes a metal material.

In various aspects, the solidified resin composition has a $T_g$ of greater than or equal to 60° C.

In various aspects, the uncured resin composition includes a thermoplastic resin or a thermoset resin. The fiber substrate material is selected from the group consisting of carbon fibers, glass fibers, basalt fibers, aramid, polyethylene fibers, polypropylene fibers, natural fibers, and a combination thereof.

In various aspects, the uncured resin composition further includes a hardener, a catalyst or a combination thereof.

In various aspects, the heat is applied from the heat source for a period of 300 seconds or less.

In various aspects, the shaped surface includes a first metal component, a second metal component, or both, and the second metal component is a mandrel.

In various aspects, the composite article includes the shaped surface, the solidified resin composition, and the fiber substrate material.

In various aspects, the method further includes removing the shaped surface after solidification of the uncured resin composition, and the composite article includes the solidified resin composition and the fiber substrate material.

In various aspects, the method further includes applying a polymer layer to the shaped surface, wherein the resin-fiber material is applied to a second exterior surface of the polymer layer to form the intermediate article.

In various aspects, the polymer layer includes a thermoplastic polymer or thermoset polymer.

In various aspects, wherein the composite article includes the polymer layer, the solidified resin composition, the fiber substrate material, and, optionally, the shaped surface.

In various aspects, a method of making a composite motor housing is also provided. The method includes applying a resin-fiber material to a metal housing to form an intermediate article, wherein the resin-fiber material includes an uncured resin composition and a fiber substrate material. The method further includes solidifying the uncured resin composition present in the intermediate article to form the composite motor housing including a solidified resin composition and the fiber substrate material. The solidifying includes applying heat from a heat source to a first exterior surface of the intermediate article, the metal housing, or both to initiate an exothermic reaction including polymerization, cross-linking, or both of the uncured resin composition. Solidifying further includes ceasing application of the heat from the heat source after initiation of the exothermic reaction, wherein polymerization, cross-linking or both of remaining uncured resin composition continues in a radial direction, a circumferential direction, an axial direction, or combination thereof through a thickness of the resin-fiber material in the absence of heat from the heat source to form the composite motor housing.

In various aspects, the heat is applied from the heat source to the motor housing of the intermediate article and the exothermic reaction is initiated in the uncured resin composition adjacent to the motor housing of the intermediate article. After application of the heat from the heat source is ceased, polymerization, cross-linking or both of the remaining uncured resin composition continues in an outward radial direction, a circumferential direction, an axial direction, or combination thereof through the thickness of the resin-fiber material toward the first exterior surface of the intermediate article.

In various aspects, the heat is applied from the heat source to the first exterior surface of the intermediate article and the exothermic reaction is initiated in the uncured resin composition adjacent to the first exterior surface of the intermediate article. After application of the heat from the heat source is ceased, polymerization, cross-linking or both of the remaining uncured resin composition continues in an inward radial direction, a circumferential direction, an axial direction, or combination thereof through the thickness of the resin-fiber material toward the motor housing of the intermediate article.

In various aspects, the heat source is selected from the group consisting of a heating coil, a heated rod, a heat blanket, a heated wire, a heat lamp, heated air, an ultraviolet source, an oven, or a combination thereof.

In various aspects, the uncured resin composition includes a thermoplastic resin or a thermoset resin, and optionally, a hardener, a catalyst or a combination thereof. The fiber substrate material is selected from the group consisting of carbon fibers, glass fibers, basalt fibers, aramid, polyethylene fibers, polypropylene fibers, natural fibers, and a combination thereof.

In various aspects, the method further includes applying a polymer layer to the metal housing, wherein the resin-fiber material is applied to a second exterior surface of the polymer layer to form the intermediate article.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1A:
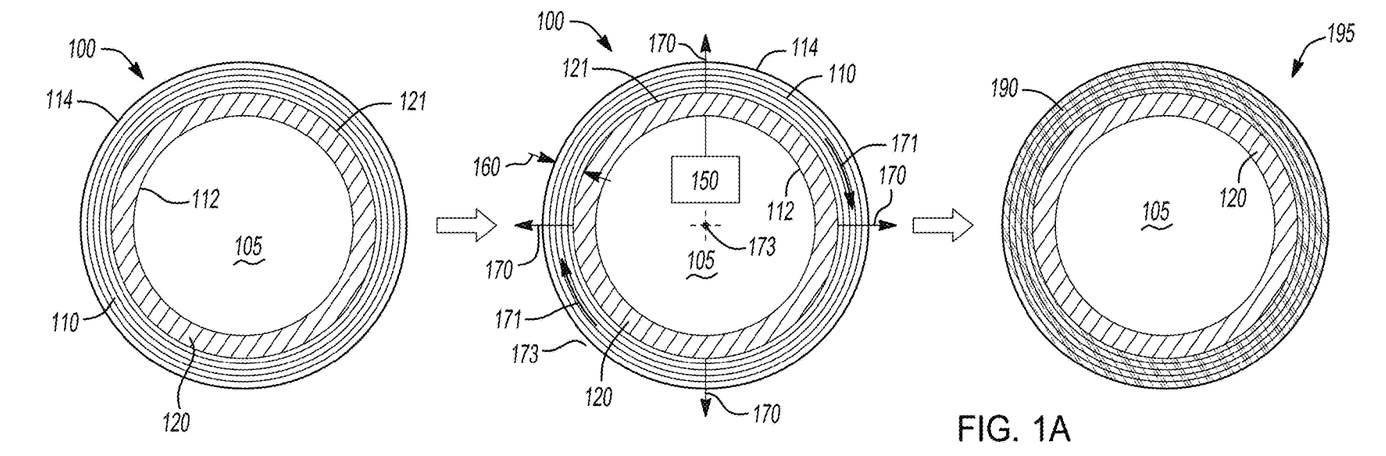
FIGS. 1A-1B illustrate methods of making a composite article according to some aspects of the present disclosure.

Methods of making a composite article are provided herein, which can advantageously be achieved via lower energy curing or solidification processes. As illustrated in FIG. 1A, the method may include applying a resin-fiber material 110 to a shaped surface 120 to form an intermediate article 100 having a first interior surface 112 and a first exterior surface 114. In any embodiment, the resin-fiber material 110 may be applied by any suitable method, for example, by winding or laying the resin-fiber material 110 circumferentially around the shaped surface 120. One or more layers of the resin-fiber material 110 may be applied and/or overlapped onto the shaped surface 120 such that a desired thickness 160 of the resin-fiber material 110 may be achieved.

As shown in FIG. 1A, the shaped surface 120 may be a cylindrical shape with a substantially round cross-section having a void 105 defined therein for forming a cylindrically shaped composite article. Although not shown, it is contemplated herein, that the shaped surface 120 can be solid without a void defined therein (e.g., a solid mandrel). Alternatively, the shaped surface 120 may be any other suitable shape for a forming a correspondingly shaped composite article. Such suitable shapes include, but are not limited to shapes having with the following cross-sections: a substantially rectangular cross-section, a polygon cross-section, a star cross-section, and a multi-lobed cross-section. As understood herein, "substantially round" may include circular and oval cross-sections and the dimensions of the cross-section may deviate in some aspects. As understood herein, "substantially rectangular" may include square cross-sections and the dimensions of the cross-section may deviate in some aspects. As understood herein, "polygon" may include triangular, pentagonal, hexagonal, heptagonal, octagonal, and so on cross-sections and the dimensions of the cross-section may deviate in some aspects. As understood herein, "star" may include from five points to twelve points, for example, a five-pointed start, a six-pointed star, a seven-pointed star and so on. As used herein, the term "multi-lobe" refers to a cross-sectional shape having a point (not necessarily in the center of the cross-section) from which at least two lobes extend (not necessarily evenly spaced or evenly sized), for example a bi-lobe, tri-lobe, and so on.

The resin-fiber material 110 may include an uncured resin composition component and a fiber substrate material component. For example, the fiber substrate material may be impregnated, coated, and/or saturated with the uncured resin composition. The resin-fiber material 110 components may be the same or different. Different resin-fiber material 110 components may include one or more of: distinct resins, fibers having different compositions (e.g., carbon and glass), and differently-fabricated fibers (e.g., woven fabric and discontinuous random fibers).

The uncured resin composition may include any suitable thermoplastic resin or thermoset resin. The thermoplastic resin may include precursors or monomers that are or can form: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), fully or partially aromatic polyamide resins, polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins. The thermoset resin may include precursors or monomers that are or can form: benzoxazine, a bis-maleimide (BMI), a cyanate ester, an epoxy, a phenolic (PF), a polyacrylate (acrylic), a polyimide (PI), an unsaturated polyester, dicyclopentadiene (DCPD) and/or 5-ethylidene-2-norbnene (ENB), a polyeurethane (PUR), a vinyl ester, a siloxane, or any combination or copolymer of these resins. Suitable epoxy resins include, but are not limited to: bisphenol A epoxy resin; bisphenol F epoxy resin; alicyclic epoxy resin; bisphenol A epoxy resin acrylates or methacrylates; alkoxylated bisphenol epoxy resin acrylates of methacrylates, alkyl epoxy resin; bisphenol A diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, diglycidyl ether of bisphenol A (DGEBA or BADGE), diglycidyl ether bisphenol F (DGFBA), and the like; and combinations thereof.

The uncured resin composition can further include a suitable hardener (also referred to as a "curing agent"), a suitable catalyst with an optional inhibitor, or a combination thereof. Suitable hardeners include, but are not limited to amine-based hardeners, such as aliphatic amines (e.g., diethylenetriamine (DETA)), aromatic amines (e.g., m-xylenediamine, m-phenylene diamine (m-PDA), methylene dianiline (MDA), diaminophenyl sulfone (DDS), cycloaliphatic amines (e.g., aminoethylpiperazine, bis-(p-aminocyclohexyl) methane) (PACM), diaminocyclohexane (DACH), bis-(dimethyldi-aminocyclohexyl)methane) (DMCH), polyetheramines, polyamides (e.g., dicyandiamide (DICY)), amidoamines, ethyleneamines, imidazoles, and anhydrides. In any embodiment, the resin composition may include a high energy density thermoset, for example, having a heat of reaction of about 200 J/g to about 500 J/g, preferably 300 J/g. Commercially available high energy density thermoset resins and hardeners include, but are not limited to Araldite® LY3585 resin (available from Huntsman International LLC), Aradur® 3475 hardener (available from Huntsman International LLC), and XB 3458 hardener (available from Huntsman International LLC). Suitable catalysts include, but are not limited to: a Grubbs catalyst (e.g., first generation, second generation, third generation and derivatives thereof), Hoveyda-Grubbs catalyst (e.g., first generation and second generation), which each can include a transition metal, such as ruthenium, optionally mixed with an inhibitor, such as trimethyl phosphite, triethyl phosphite, or tributyl phosphite; and a solvent, phenylcyclohexane. Other suitable inhibitors include quinones (e.g. hydroquinone) and their derivatives, sterically hindered phenols, tertiary butyl catechol (TBC), trimethyl phosphite, triethyl phosphite, tributyl phosphite, and alkyl phosphite.

In any embodiment, the uncured resin composition may have a $T_g$ (glass transition temperature) of less than or equal to about 0° C., for example, -50° C. to -20° C. In any embodiment, the solidified resin composition may have a $T_g$ (glass transition temperature) of greater than or equal to about 60° C., greater than or equal to about 70° C., greater than or equal to about 80° C., greater than or equal to about 90° C., greater than or equal to about 100° C., greater than or equal to about 120° C., greater than or equal to about 150° C., greater than or equal to about 175° C., or about 200° C. In any embodiment, the solidified resin composition may have a $T_g$ of about 60° C. to about 200° C., about 70° C. to about 200° C., or about 80° C. to about 200° C.

The fiber substrate material can include tape, tow, and cloth. "Tape" generally refers to uniaxial reinforcement fibers that extend along a single axis of the strip material. "Tow" is a type of substrate that typically comprises untwisted or twisted bundles of continuous filaments. Tow filaments often comprise carbon or glass. The term "cloth" generally refers to reinforcement fibers laid along at least two different axes within the material. Cloth is commercially available as bi-axial, tri-axial and quad-axial, indicating fibers extending in two, three, or four different axes, respectively. The fibers may optionally be woven with one another, or may be manufactured as non-woven cloth.

The fiber substrate may include: carbon fibers, glass fibers (e.g., fiber glass, quartz), basalt fibers, aramid fibers (e.g., KEVLAR®, polyphenylene benzobisoxazole (PBO), polyethylene fibers (e.g., ultra-high molecular weight polyethylene (UHMWPE)), polypropylene fibers (e.g., high-strength polypropylene), natural fibers (e.g., cotton, flax, cellulose, spider silk), and combinations thereof, by way of non-limiting example.

As appreciated by those of skill in the art, the resin-fiber material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

Figure 1B:
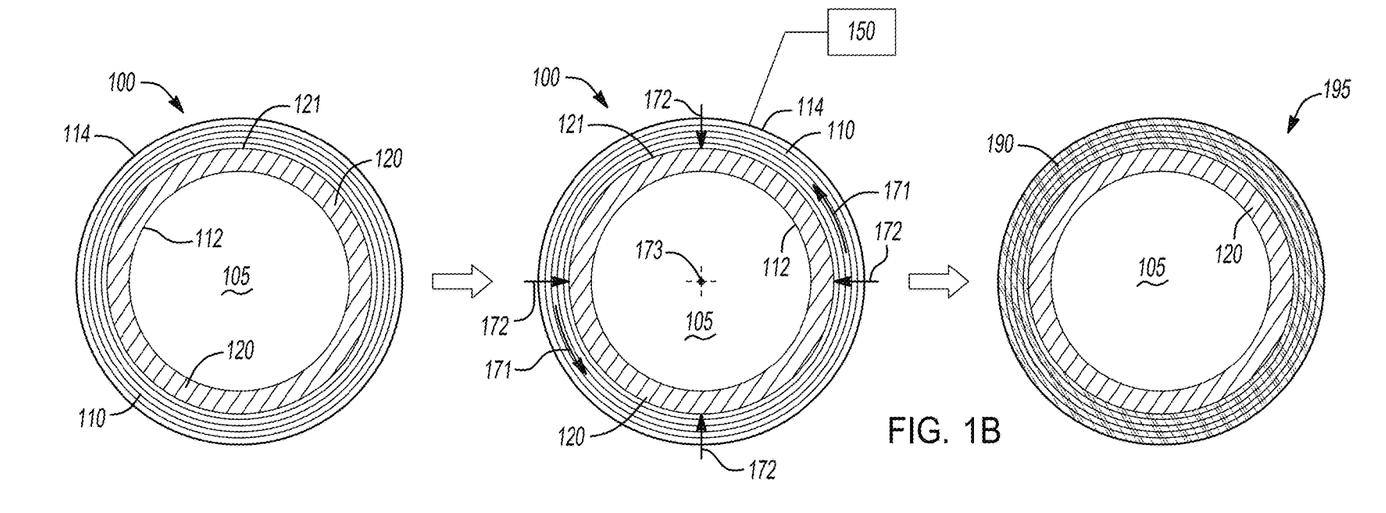
Figures 1C, 2A:
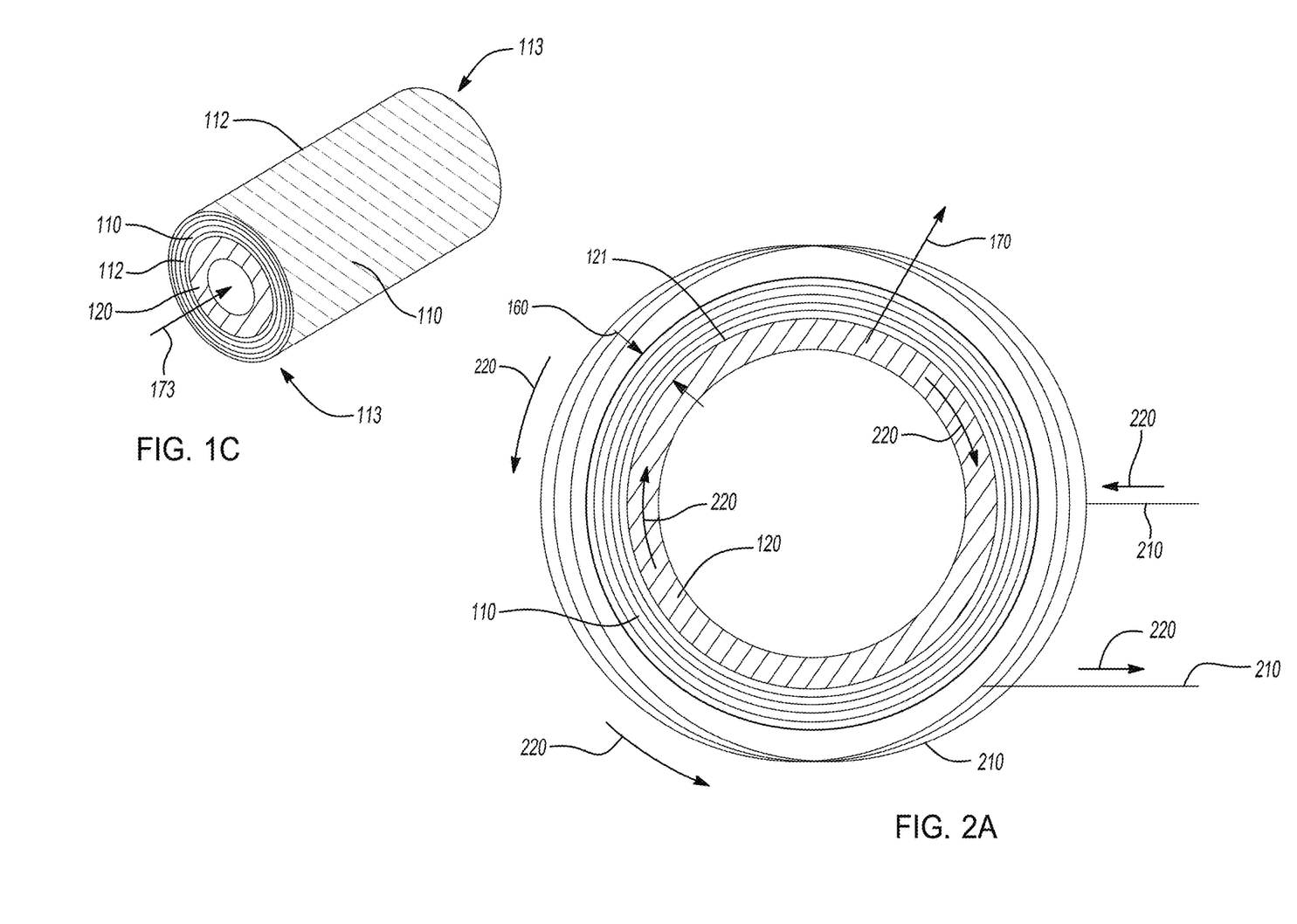
FIG. 1C shows an intermediate article during the methods of making the composite article.
FIGS. 2A and 2B illustrate solidification of uncured resin composition according to some aspects of the present disclosure.

In any embodiment, the method may further include solidifying (e.g., curing) the uncured resin composition present in the intermediate article 100 to form composite material 190 of composite article 195. The composite material 190 includes the solidified resin composition and the fiber substrate material. Solidifying can include applying heat from a heat source 150 (also referred to as heat source 150) to the intermediate article 100. For example, as shown in FIG. 1A, heat from heat source 150 may be applied directly or indirectly to the shaped surface 120. For example, heat may be applied to at least a portion of the first interior surface 112 of the intermediate article 100. Additionally or alternatively, heat may be applied internally to a shaped surface 120 (e.g., a solid shaped surface), which in turn, transfers heat to the uncured resin composition adjacent to the shaped surface 120. Alternatively, as shown in FIG. 1B, heat may be applied from heat source 150 to at least a portion of the first exterior surface 114 of the intermediate article 100. As understand herein, the first exterior surface 114 encompasses the surfaces at the ends 113 of intermediate article 100, as shown in FIG. 1C. Although not shown, it is contemplated herein that heat may be applied from heat source 150 to both the shaped surface 120 (e.g., first interior surface 112) and the first exterior surface 114. Heat from heat source 150 may be applied for a suitable duration to initiate an exothermic reaction of the uncured resin composition thereby initiating solidification (e.g., curing) of the uncured resin composition. The exothermic reaction can include polymerization, cross-linking, or both of the uncured resin composition. In any embodiment, heat can be applied from the heat source for a period of 10 minutes (600 seconds) or less, 5 minutes (300 seconds) of less, 60 seconds or less, 30 seconds or less, 15 seconds or less, 5 seconds or less, 1 second or less; 1 millisecond or less, or about 1 microsecond; or from about about 1 microsecond to about 10 minutes, 1 microsecond to about 10 minutes, about 1 microsecond to about 5 minutes, about 1 microsecond to about 60 seconds, about 1 microsecond to about 30 seconds, about 1 second to about 15 seconds, or about 1 second to about 5 seconds.

Once the exothermic reaction is initiated, application of heat from heat source 150 may be ceased. For example, application of heat from heat source 150 may be stopped once the resin-fiber material reaches a sufficient temperature (referred to as an "initiation temperature") such that polymerization, cross-linking or both of the uncured resin composition can occur in a self-propagating manner via the exothermic reaction initiated and heated generated therefrom. This initiation temperature is dependent upon the uncured resin composition selected as understood by one of ordinary skill in the art. In some embodiments, once the initiation temperature is achieved, for example, once the initiation temperature is measured or observed, the heat source 150 can be turned off. Since the exothermic reaction is a self-propagating reaction generating heating, polymerization, cross-linking, or both of remaining uncured resin composition can continue in a radial direction, a circumferential direction, an axial direction, or a combination thereof through thickness 160 of the resin-fiber material 110 in the absence of heat from heat source 150 to form the composite article 195. In other words, solidification of the uncured resin composition can first be initiated by heat source 150, but once heat source 150 is stopped or turned off, solidification (e.g., curing) can continue in a radial direction, a circumferential direction, an axial direction, or a combination thereof through the thickness 160 of the resin-fiber material 110 due to heat generated by the exothermic reaction whereby a portion of to substantially all of the uncured resin composition can solidify. Therefore, advantageously only a small amount of energy is needed to form the composite article.

As further illustrated in FIG. 1A, application of heat from heat source 150 to the shaped surface 120, for example, the first interior surface 112 of the intermediate article 100 can initiate the exothermic reaction at least at a portion of the uncured resin composition, for example, at fourth surface 121, adjacent to the shaped surface 120 via heat transfer from the shaped surface 120. After ceasing application of heat from the heat source 150, polymerization, cross-linking, or both of the remaining uncured resin composition can continue in an outward radial direction as illustrated by arrows 170, a circumferential direction as illustrated by arrows 171, an axial direction as illustrated by arrows 173, or a combination thereof through the thickness 160 of the resin-fiber material 110 toward the first exterior surface 114. Alternatively, as illustrated in FIG. 1B, application of heat from heat source 150 to the first exterior surface 114 of the intermediate article 100 can initiate the exothermic reaction in at least a portion of the uncured resin composition adjacent to the first exterior surface 114. After ceasing application of heat from the heat source 150, polymerization, cross-linking, or both of the uncured resin composition can continue in an inward radial direction as illustrated by arrows 172, a circumferential direction as illustrated by arrows 171, an axial direction as illustrated by arrows 173, or a combination thereof through the thickness 160 of the resin-fiber material 110 toward the shaped surface 120, for example, fourth surface 121.

In any embodiment, heat from the heat source 150 can be applied to a single location, for example, as a single point source, on the intermediate article 100, two or more locations on the intermediate article 100, or heat can be substantially uniformly distributed around the intermediate article 100, either along first interior surface 112, first exterior surface 114, or both. Additionally or alternatively, heat from the heat source 150 may be applied directly or indirectly as well as internally or externally. Any suitable heat source 150 for applying heat known to one of ordinary skill in the art may be used. Examples of a suitable heat source 150 include, but are not limited to a heating coil (e.g., a copper coil for inducing a current and generating heat), a heated rod, a heat blanket, a heated wire, a heat lamp, heated air, an ultraviolet (UV) source (UV irradiation), an oven, a plasma source, visible light source, or a combination thereof and is dependent on the chemistry chosen and known to those of skill in the art.

Figure 2B:
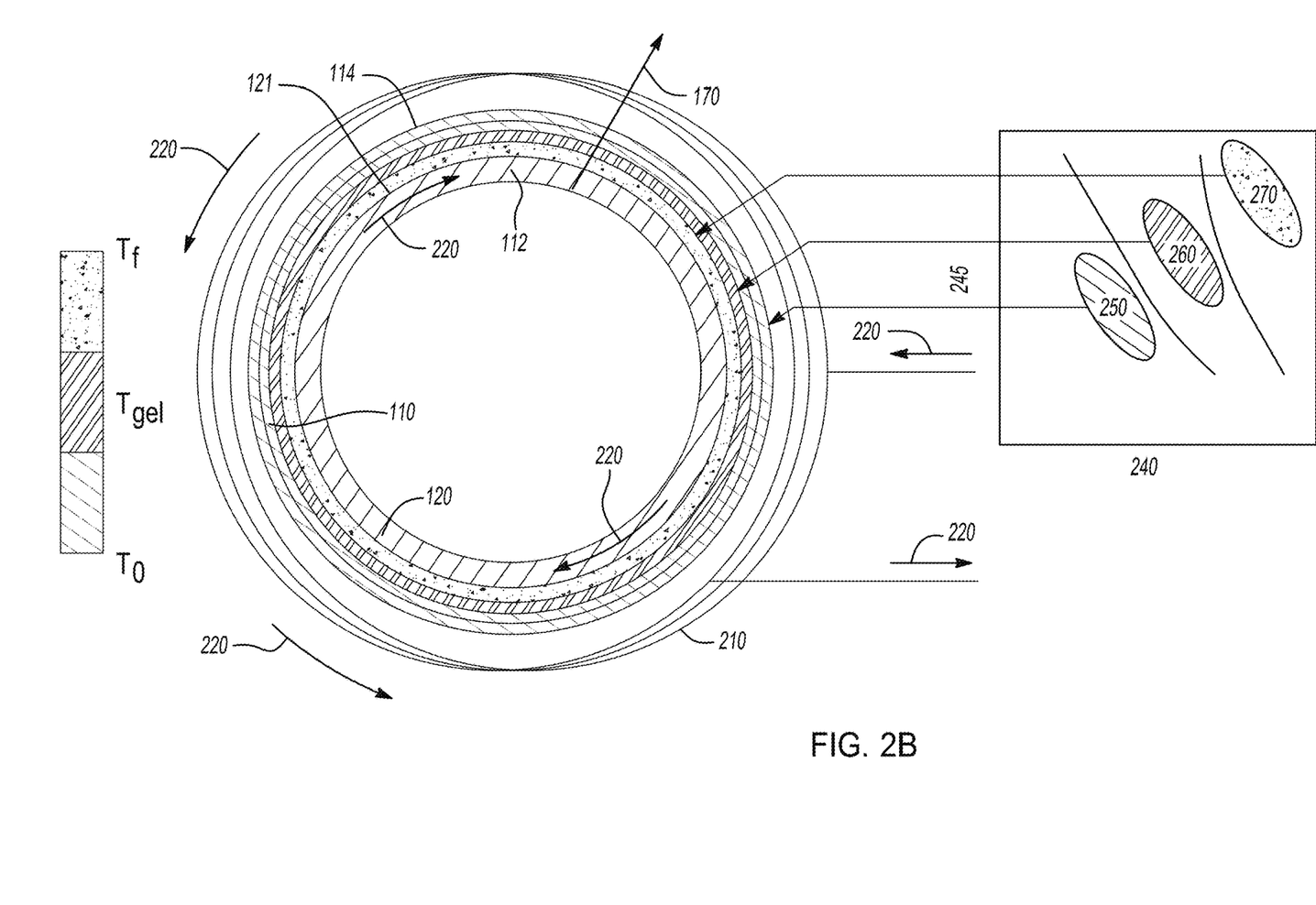

An example of heating coil and its use in the methods described herein is shown in FIG. 2A. At least a portion of intermediate article 100 can be placed within heating coil 210. Once turned on, heating coil 210 can induce a current as represented by arrows 220, which can heat shaped surface 120 and initiate an exothermic reaction of the uncured resin composition for example, at fourth surface 121, adjacent to shaped surface 120 of the intermediate article 100. After turning off the heating coil 210, polymerization, cross-linking, or both of the remaining uncured resin composition can continue in an outward radial direction as illustrated by arrow 170, a circumferential direction as illustrated by arrows 171, an axial direction as illustrated by arrows 173, or a combination thereof through the thickness 160 of the resin-fiber material 110 toward the first exterior surface 114. FIG. 2B further illustrates an exemplary progression of the solidification process of the uncured resin composition adjacent to the first interior surface 112 once the exothermic reaction is initiated in the uncured resin composition for example, at fourth surface 121, adjacent to shaped surface 120. The graph shows gel or vitrification time 240 v. isothermal cure temperature 245 with the liquid region 250, sol/gel/rubber region 260, and gelled/glass region 270. As the polymerization, cross-linking, or both continues or moves through the thickness 160 of the resin-fiber material 110 in an outward radial direction illustrated by arrow 170, a circumferential direction as illustrated by arrows 171, a an axial direction as illustrated by arrows 173, or a combination thereof, the uncured resin composition progresses through the states of the gelled/glass region 270, sol/gel/rubber region 260, and liquid region 250, as time and temperature increases. The temperature and time at which the uncured resin composition is in a state corresponding to the liquid region 250, sol/gel/rubber region 260 and/or gelled/glass region 270 depends on the uncured resin composition used and the associated curing kinetics of the uncured resin composition and can be readily determined by a person of ordinary skill in the art. It is contemplated herein, that depending on the timing of the exothermic reaction (e.g., how long the exothermic reaction has been proceeding), the temperature of the uncured resin composition, as well as the particular uncured resin composition used, the state of the uncured resin composition can exist in one, two, or all three of the liquid region 250, sol/gel/rubber region 260 and gelled/glass region 270 during the methods described herein. As used herein, "solidified resin" or "cured resin" encompasses a resin composition in a state corresponding to its sol/gel/rubber region 260, gelled/glass region 270, or a combination thereof.

Figure 3A:
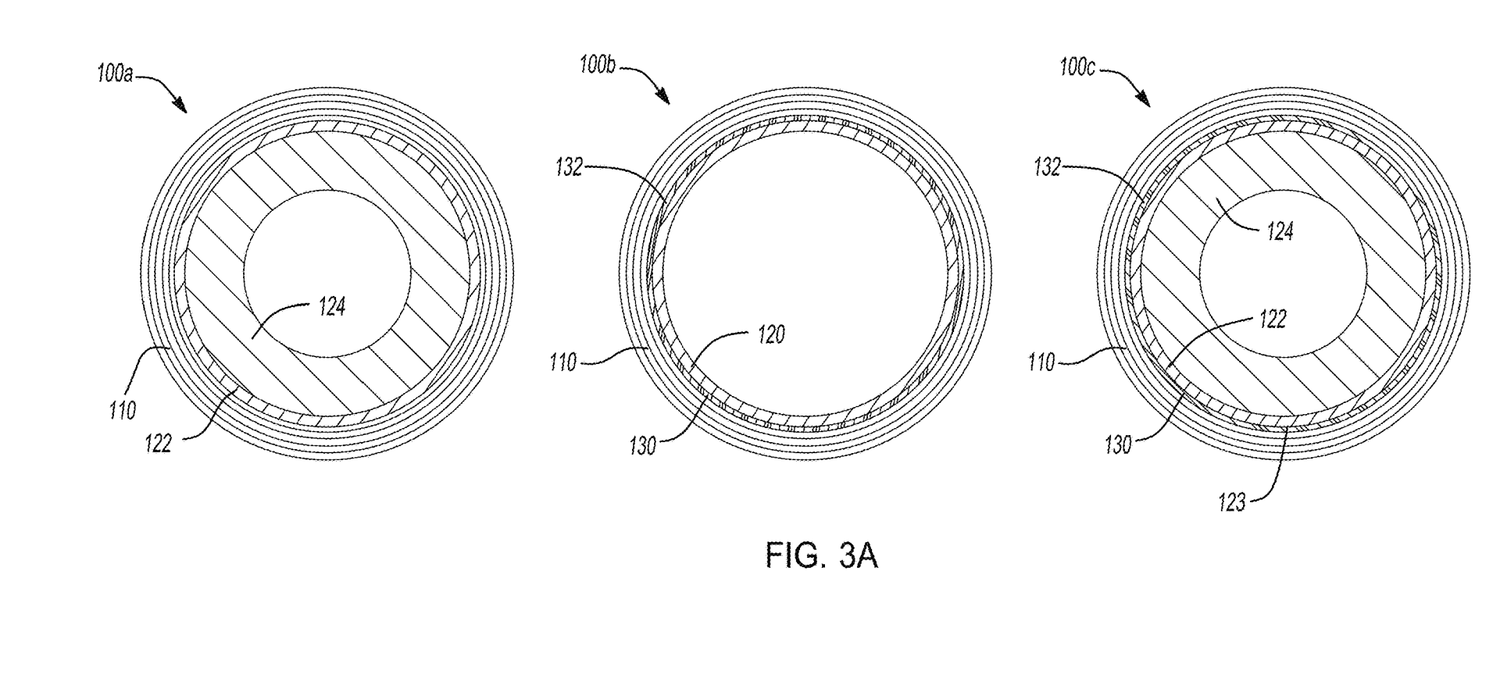
FIGS. 3A and 3B illustrate, respectively, alternative intermediate articles and composite articles formed according to some aspects of the present disclosures.
Figure 3B:
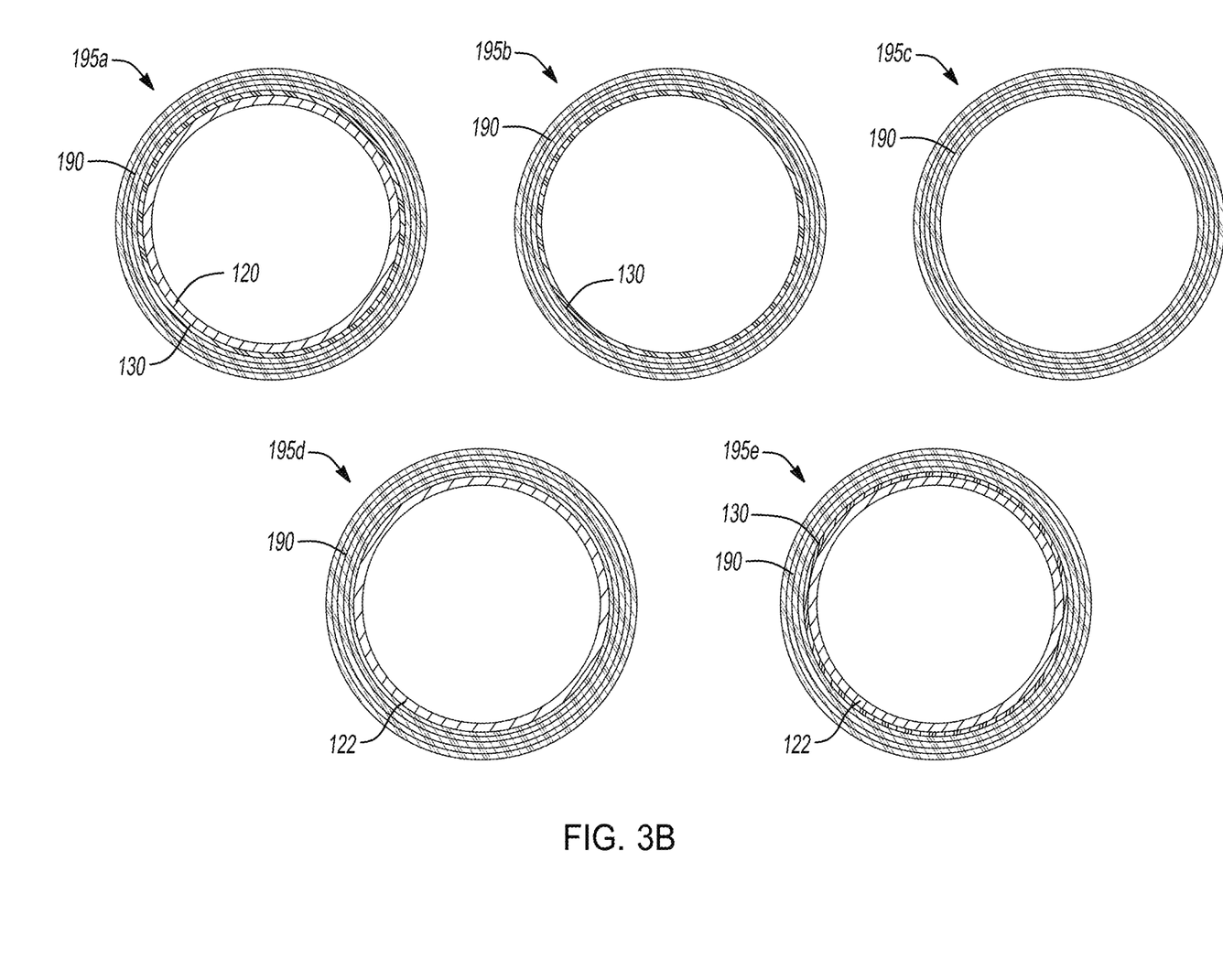

In any embodiment, the shaped surface 120 can be any suitable material, for example, a metal material, such as aluminum or steel, a polymer material, or a combination thereof. In some embodiments, the shaped surface 120 can be the work surface, such as a mandrel, on which the resin-fiber material 110 is applied and after solidification of the uncured resin composition, the mandrel may be removed. For example, as shown in FIG. 3B, a composite article 195c formed from the methods described herein can include composite material 190 including the solidified resin composition and the fiber substrate material. In other embodiments, the shaped surface 120 can be intended for incorporation into the finished composite article; thus, the shaped surface 120 remains after solidification of the uncured resin composition. For example, as shown in FIG. 1A, a composite article 195 formed from the methods described herein includes composite material 190 including the solidified resin composition and the fiber substrate material as well as the shaped surface 120.

Additionally or alternatively, the shaped surface 120 can include one or more separate components, for example, a first component and a second component. For example, as illustrated in FIG. 3A, intermediate article 100a can include a shaped surface including a first component 122 and a second component 124. The first component 122 and the second component 124 each can be any suitable material, for example, a metal material, such as aluminum or steel. In some embodiments, first component 122 can be intended for incorporation into the finished composite article, and the second component 124 can be a mandrel, which is removed after solidification of the uncured resin composition. Thus, as shown in FIG. 3B, a composite article 195d can be formed including composite material 190 including the solidified resin composition and the fiber substrate material as well as the first component 122. For example, the second component 122 may be an aluminum housing, for example, for a motor, having a composite material 190 disposed thereon to form the composite article.

Additionally or alternatively, the methods described herein may further include applying a polymer layer 130 onto shaped surface 120 followed by application of the resin-fiber material 110 to a second exterior surface 132 of the polymer layer 130 to form intermediate article 100b, as shown in FIG. 3A. An example of a composite article formed from intermediate article 100b is composite article 195a, as shown in FIG. 3B, which includes composite material 190 including the solidified resin composition and the fiber substrate material, polymer layer 130, and shaped surface 120. Alternatively, where the shaped surface 120 is removed following solidification of the uncured resin composition, for example, where the shaped surface 120 is a mandrel, composite article 195b can be formed from intermediate article 100b. Composite article 195b includes composite material 190 including the solidified resin composition and the fiber substrate material and polymer layer 130. In another embodiment, polymer layer 130 can be applied on third exterior surface 123 of a first component 122 followed by application of the resin-fiber material 110 to a second exterior surface 132 of the polymer layer 130 to form intermediate article 100c, as shown in FIG. 3A. An example of a composite article formed from intermediate article 100c is composite article 195e, as shown in FIG. 3B, which includes composite material 190 including the solidified resin composition and the fiber substrate material, polymer layer 130, and first component 122. The polymer layer 130 can be in the form of a film and may serve as an insulating layer, which can more evenly distribute heat applied from heat source 150. Any suitable polymer material may be used for polymer layer 130 including, but not limited to a thermoplastic polymer or thermoset polymer. The thermoplastic polymer may include: polyvinyl chloride, polyvinylidene chloride resin, polyvinyl acetate, polyvinyl alcohol, polystyrene, polyacrylonitrile styrene, polyacrylonitrile-butadiene-styrene, polyacrylic acid, polymethacrylate, polyethylene, polypropylene, polyamide (PA6, PA11, PA12, PA46, PA66, PA610), fully or partially aromatic polyamide, polyacetal, polycarbonate, polyethylene terephthalate, polyethylene naphthalate, polybutylene terephthalate, polyacrylate, polyphenylene ether, polyphenylene sulfide, polysulfone, polyether sulfone, polyether ether ketone, polylactide, or any combination or copolymer thereof. The thermoset polymer may include: benzoxazine, a bis-maleimide (BMI), a cyanate ester, an epoxy, a phenolic (PF), a polyacrylate (acrylic), a polyimide (PI), an unsaturated polyester, dicyclopentadiene (DCPD), 5-ethylidene-2-norbnene (ENB), a polyeurethane (PUR), a vinyl ester, a siloxane, or any combination or copolymer thereof. Suitable epoxies include, but are not limited to: bisphenol A epoxy; bisphenol F epoxy; alicyclic epoxy; bisphenol A epoxy acrylates or methacrylates; alkoxylated bisphenol epoxy acrylates of methacrylates, alkyl epoxy; bisphenol A diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, diglycidyl ether of bisphenol A (DGEBA or BADGE), diglycidyl ether bisphenol F (DGFBA), and the like; and combinations thereof.

In some embodiments, the methods described herein may further include a further heating of the composite article to further solidify the resin composition. For example, the composite article may be heated in an oven to further solidify or complete solidification of the resin composition, for example, to achieve the gelled/glass region 270 of the resin composition. Additionally or alternatively, the composite material can be joined to other components by adhesive. Suitable adhesives include adhesives based on methacrylate resins, urethane resins, or epoxy resins, by way of non-limiting example.

The methods described herein can be applied to various applications for forming various composite articles. Exemplary composite articles that can be formed from the methods described herein include, but are not limited to automotive components, such as composite (e.g., carbon fiber composite) overwrapped aluminum pinion cartridges, composite (e.g., carbon fiber composite) driveshafts, hydrogen storage tanks, composite (e.g., carbon fiber composite) overwrapped shrink fit motor housing, and so on, and nonautomotive articles, such as golf shafts, pipes, bicycle components, transmission poles, aircraft fuselages, ship masts and so on.

Figure 4A:
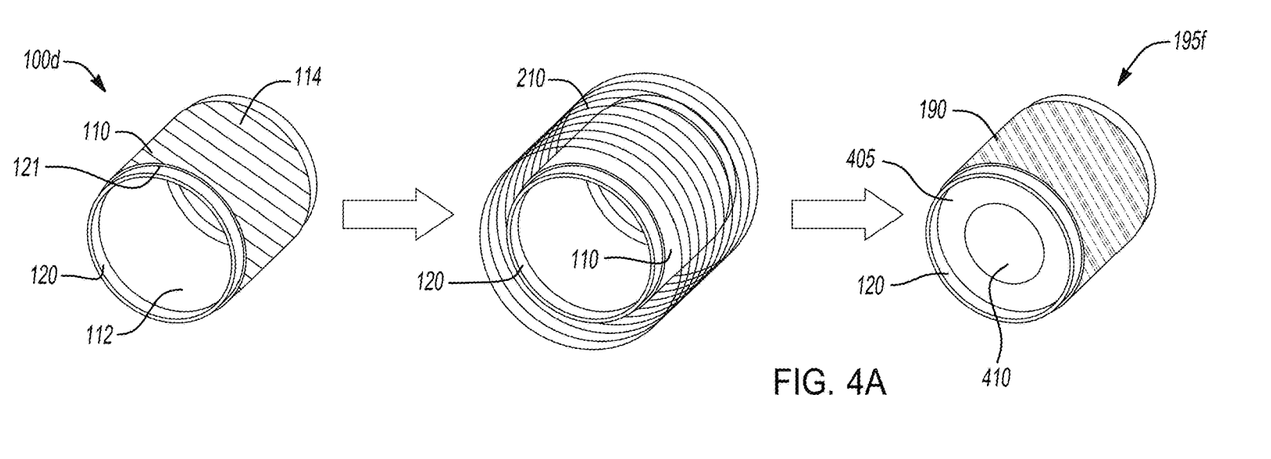
FIGS. 4A and 4B illustrate methods of making a composite motor housing according to some aspects of the present disclosure.

An example of application of the methods described herein for forming a composite automotive component is shown in FIG. 4A, such as a composite motor housing. As illustrated in FIG. 4A, resin-fiber material 110 as described herein may be applied to a shaped surface 120, such as a metal housing (e.g., aluminum housing) to form intermediate article 100d. Heat from a heat source may be applied as described herein, for example, via a heating coil 210, to intermediate article 100d to solidify the uncured resin composition to form composite motor housing 195f, which includes composite material 190 as described herein disposed on the shaped surface 120 (i.e., the aluminum housing). As shown in FIG. 4A, a heating coil 210 is illustrated, but is contemplated herein that any suitable heating source as described herein may be used. Following formation of composite motor housing 195f, a motor, such as a stator 410 and rotor 405, may be fit, such as shrink fit, within the composite motor housing 195f.

Figure 4B:
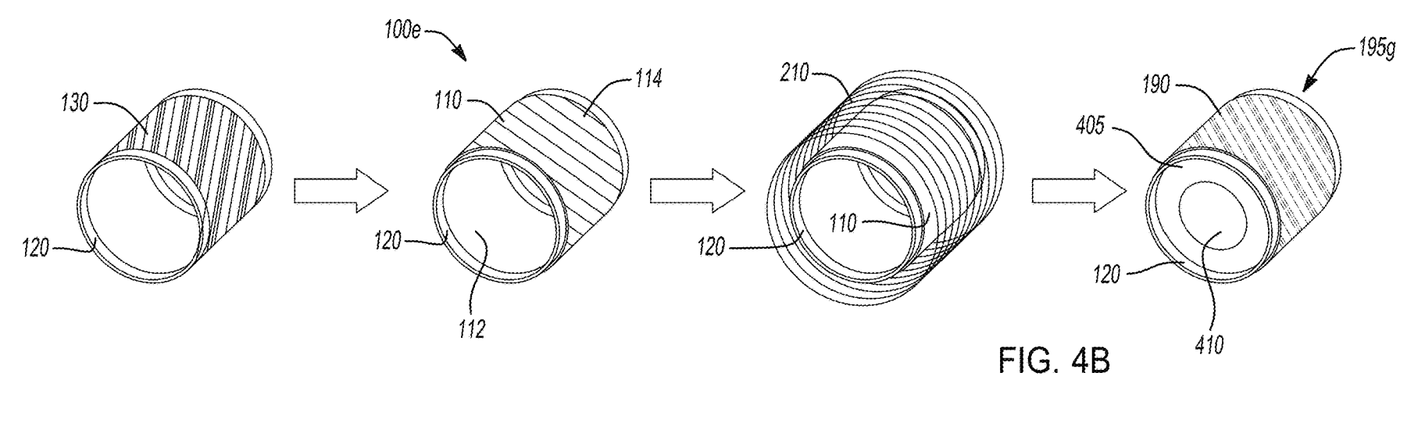

Optionally, as shown in FIG. 4B, a polymer layer 130 as described herein may be applied to shaped surface 120, such as a metal housing (e.g., aluminum housing) followed by application of resin-fiber material 110 to form intermediate article 100e. Heat from a heat source may be applied as described herein, for example, via a heating coil 210, to intermediate article 100e to solidify the uncured resin composition to form composite motor housing 195g, which includes composite material 190 as described herein disposed on polymer layer 130 and the shaped surface 120 (i.e., the aluminum housing). Following formation of composite motor housing 195g, a motor, such as a stator 410 and rotor 405, may be fit, such as shrink fit, within the composite motor housing 195g. It is contemplated herein, that methods of forming a composite motor housing as illustrated in FIGS. 4A and 4B can further include a machining step of the aluminum housing either before the resin-fiber material 110 is applied or after solidification of the uncured resin composition. Although not shown, it is contemplated herein, a motor, such as a stator 410 and rotor 405, can be placed or fitted into the shaped surface 120, such as a metal housing (e.g., aluminum housing) followed by application of resin-fiber material 110 to form intermediate article 100d, 100e.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a composite motor housing fitted with a stator and a rotor, the method comprising:
    applying a resin-fiber material to a metal housing to form an intermediate article, wherein the resin-fiber material comprises an uncured resin composition and a fiber substrate material;
    solidifying the uncured resin composition present in the intermediate article to form the composite motor housing comprising a solidified resin composition and the fiber substrate material, wherein solidifying comprises:
        applying heat from a heat source to a first exterior surface of the intermediate article, the metal housing, or both to initiate an exothermic reaction comprising polymerization, cross-linking, or both of the uncured resin composition;
        ceasing application of the heat from the heat source after initiation of the exothermic reaction, wherein polymerization, cross-linking or both of remaining uncured resin composition continues in a radial direction, a circumferential direction, an axial direction, or combination thereof through a thickness of the resin-fiber material in the absence of heat from the heat source to form the composite motor housing; and
    fitting the stator and the rotor within the composite motor housing.

2. The method of claim 1, wherein the heat is applied from the heat source to the motor housing of the intermediate article and the exothermic reaction is initiated in the uncured resin composition adjacent to the motor housing of the intermediate article, and after application of the heat from the heat source is ceased, polymerization, cross-linking or both of the remaining uncured resin composition continues in an outward radial direction, a circumferential direction, an axial direction, or combination thereof through the thickness of the resin-fiber material toward the first exterior surface of the intermediate article; or
    wherein the heat is applied from the heat source to the first exterior surface of the intermediate article and the exothermic reaction is initiated in the uncured resin composition adjacent to the first exterior surface of the intermediate article, and after application of the heat from the heat source is ceased, polymerization, cross-linking or both of the remaining uncured resin composition continues in an inward radial direction, a circumferential direction, an axial direction, or combination thereof through the thickness of the resin-fiber material toward the motor housing of the intermediate article.

3. The method of claim 1, the heat source is selected from the group consisting of a heating coil, a heated rod, a heat blanket, a heated wire, a heat lamp, heated air, an ultraviolet source, an oven, or a combination thereof.

4. The method of claim 1, wherein the uncured resin composition comprises a thermoplastic resin or a thermoset resin, and optionally, a hardener, a catalyst or a combination thereof; and wherein the fiber substrate material is selected from the group consisting of carbon fibers, glass fibers, basalt fibers, aramid, polyethylene fibers, polypropylene fibers, natural fibers, and a combination thereof.

5. The method of claim 1, further comprising applying a polymer layer to the metal housing, wherein the resin-fiber material is applied to a second exterior surface of the polymer layer to form the intermediate article.

6. The method of claim 5, wherein the polymer layer comprises a thermoplastic polymer or thermoset polymer.

7. The method of claim 1, wherein the metal housing has a cylindrical shape and the resin-fiber material is circumferentially applied around the metal housing.

8. The method of claim 1, wherein the solidified resin composition has a $T_g$ of greater than or equal to 60° C.

9. The method of claim 1, wherein the heat is applied from the heat source for a period of 300 seconds or less.

* * * * *